United States Patent
Watanabe et al.

(10) Patent No.: US 7,267,104 B2
(45) Date of Patent: Sep. 11, 2007

(54) INTERNAL COMBUSTION ENGINE START-UP CONTROL

(75) Inventors: Satoshi Watanabe, Yokohama (JP); Ritsuo Satou, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/455,884

(22) Filed: Jun. 20, 2006

(65) Prior Publication Data

US 2006/0288983 A1 Dec. 28, 2006

(30) Foreign Application Priority Data

Jun. 28, 2005 (JP) ............................. 2005-187822

(51) Int. Cl.
*F02D 13/02* (2006.01)
*F02D 43/00* (2006.01)

(52) U.S. Cl. .................... 123/406.45; 123/179.18; 123/90.15; 701/112

(58) Field of Classification Search .......... 123/406.45, 123/90.15, 90.17, 179.15, 179.18; 701/112, 701/102, 115
See application file for complete search history.

(56) References Cited

U.S. PATENT DOCUMENTS

| 4,562,817 A | 1/1986 | Ito |
| 6,600,989 B2 * | 7/2003 | Sellnau et al. .............. 701/110 |
| 7,055,492 B2 * | 6/2006 | Yamaoka et al. ........ 123/90.15 |
| 2006/0112680 A1 | 6/2006 | Beer et al. |

FOREIGN PATENT DOCUMENTS

| EP | 1 344 897 A2 | 9/2003 |
| EP | 1 431 548 A2 | 6/2004 |
| JP | 2003-3872 | 1/2003 |
| JP | 2005-127230 A | 5/2005 |
| WO | WO 2004/055347 A1 | 7/2004 |

* cited by examiner

*Primary Examiner*—Hieu T. Vo
(74) *Attorney, Agent, or Firm*—Foley & Lardner LLP

(57) ABSTRACT

A variable valve mechanism (12*a*, 12*b*) varies a lift amount and an opening/closing timing of an intake valve (10) of an internal combustion engine (1). During a first period in an engine start operation, wall flow is suppressed by setting the lift amount of the intake valve (10) to be smaller so as to increase the intake air velocity. During a second period, which starts after the first period ends, the atomization of injected fuel is enhanced by increasing a valve overlap amount between the intake valve (10) and an exhaust valve (11) so as to promote blow-back of the combustion gas to an intake port (4). By sequentially applying a process for increasing the intake air velocity and a process for increasing the valve overlap amount, the emission of unburned hydrocarbon during the engine start is effectively reduced.

16 Claims, 7 Drawing Sheets

INTERNAL COMBUSTION ENGINE START-UP CONTROL

FIELD OF THE INVENTION

This invention relates to start-up control of an engine provided with a variable valve mechanism.

BACKGROUND OF THE INVENTION

During a cold start of an internal combustion engine, or in a period immediately after the cold start thereof, the temperature of intake valves and that of the walls of the intake ports are low, and fuel adhered to these parts is not likely to atomize. As a result, the amount of fuel flowing into the combustion chamber is small with respect to the amount of fuel injected from the fuel injectors.

The fuel adhered to the intake valves or the walls of the intake ports forms so called a wall flow. It is known that the wall flow flows into the combustion chamber at a delay with respect to the flow of fuel which is directly aspirated into the combustion chamber in the form of mist or vapor.

During the engine start and a period immediately after the engine start, the fuel injection amount is generally increased to compensate for the fact that a part of the injected fuel forms a wall flow. When the fuel is constituted by heavy components, the rate of atomization is low in comparison with a fuel constituted by light components, and hence, the fuel easily forms a wall flow. In order to accomplish a successful engine start without suffering a shortage of fuel in the combustion chamber irrespective of the fuel mass, i.e., heavy or light, an increase in the fuel injection amount is determined on the assumption that the fuel is constituted by heavy components.

When a fuel constituted by light components is used, the wall flow decreases because the fuel is more likely to atomize than a fuel constituted by heavy components, and therefore, the fuel amount supplied to the combustion chamber is apt to be excessive. Accordingly, the air/fuel ratio of the air-fuel mixture in the combustion chamber becomes rich, which increases the emission of unburned hydrocarbon (HC).

JP2003-003872A published by the Japan Patent Office in 2003, proposes to vary the operation characteristics of the intake valve to cope with this problem. This prior art relates to an engine provided with a variable valve timing control (VTC) mechanism which enables variation in the opening/closing timing of the intake valve, and a variable valve event and lift control (VEL) mechanism which enables variation in the lift amount of the intake valve. The prior art proposes to decrease the lift amount of the intake valve and retard the opening/closing timing thereof during a period from the engine start until a certain time point when the engine is warming up.

When the lift amount of the intake valve is reduced, the flow area of the intake valve is also reduced, and the velocity of the intake air aspirated through the intake valve increases. The increased velocity of the intake air promotes atomization of the fuel adhered to the intake valve and the walls of the intake port as well as to accelerate the fuel flow towards the combustion chamber. As a result, the amount of wall flow decreases.

This phenomenon reduces wall flow equally irrespective of differences in the components of the fuel. According to the prior art, therefore, it is possible to decrease the increase in the fuel injection amount required for engine start and, as a result, the increase required for fuel constituted by heavy components and the increase required for the fuel constituted by light components are almost the same such that the engine can be started with an identical increase irrespective of the fuel characteristics while suppressing increase in the emission of unburned HC.

By increasing the intake air velocity, mixing of air and fuel in the combustion chamber is enhanced, and stable combustion is ensured even when the ignition timing is retarded. Retarding the ignition timing brings about a high exhaust gas temperature which enables early activation of an exhaust gas purification catalyst.

The prior art therefore has an effect of improving the exhaust gas composition during engine start-up as well as accelerating a temperature increase in the exhaust gas.

SUMMARY OF THE INVENTION

Another known technique to decrease wall flow amount during engine start-up other than decreasing the lift amount of the intake valve as in the prior art is to promote a valve overlap between the intake valve and the exhaust valve.

When the valve overlap is promoted, a blow-back of the combustion gas to the intake port occurs, and atomization of the injected fuel is promoted by the heat of the combustion gas.

According to research conducted by the inventors, this method is heavily dependent on the characteristics of the fuel used, and the difference in the effects of the decreasing wall flow amount when the method is applied to fuel constituted by heavy components and fuel constituted by light components is larger than in the case of the prior art technique, when the temperature of the intake valve and the walls of the intake port is low.

On the other hand, when the temperature of the intake valve and the walls of the intake port has risen to a certain level, the absolute amount of wall flow is small and the effect of the prior art technique is also small. As a result, the effect of promoting valve overlap surpasses the effect of the prior art technique at a certain time point from the engine start.

It is therefore an object of this invention to further suppress the emission of unburned HC during start-up of an internal combustion engine.

In order to achieve the above object, this invention provides a start control device for an internal combustion engine which comprises an intake valve and an exhaust valve. The device comprises a mechanism which varies a lift amount of the intake valve and a valve overlap amount between the intake valve and the exhaust valve, and a programmable controller for controlling the mechanism.

The controller is programmed to control the mechanism to maintain a predetermined lift amount and a predetermined valve overlap amount during a normal idle running state of the engine, control the mechanism during a first period which starts from a start of the engine to apply a smaller lift amount than the predetermined lift amount, and control the mechanism during a second period, which starts after the first period ends, to apply a greater valve overlap amount than the predetermined valve overlap amount.

This invention also provides a start control method for an internal combustion engine which comprises an intake valve, an exhaust valve, and a mechanism which varies a lift amount of the intake valve and a valve overlap amount between the intake valve and the exhaust valve while both the intake valve and the exhaust valve are open.

The method comprises controlling the mechanism to maintain a predetermined lift amount and a predetermined valve overlap amount during a normal idle running state of the engine, controlling the mechanism during a first period which starts from a start of the engine to apply a smaller lift amount than the predetermined lift amount, and controlling the mechanism during a second period, which starts after the first period ends, to apply a greater valve overlap amount than the predetermined valve overlap amount.

The details as well as other features and advantages of this invention are set forth in the remainder of the specification and are shown in the accompanying drawings.

DESCRIPTION OF THE PREFERRED EMBODIMENTS

Figure 1:
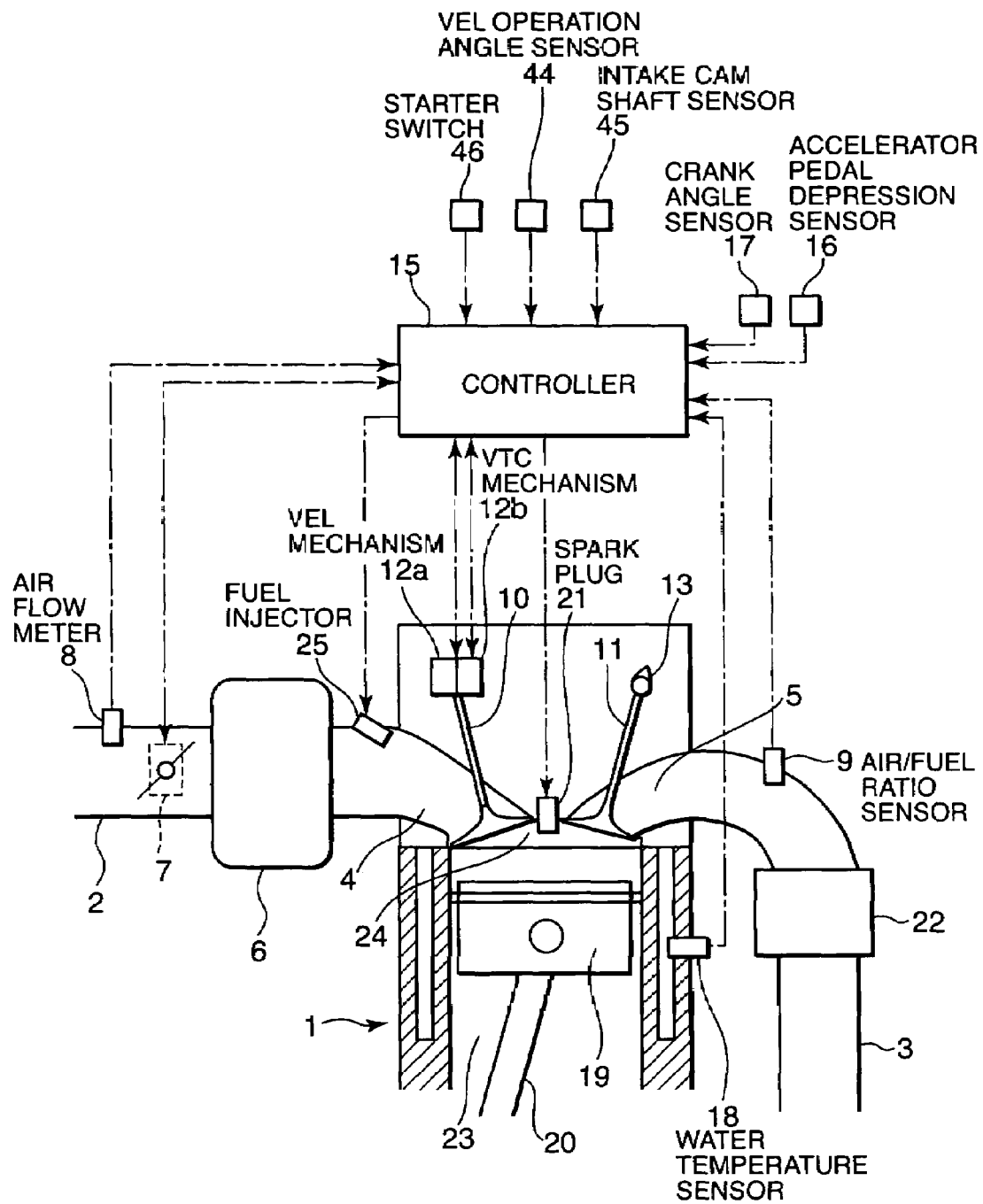
FIG. 1 is a schematic diagram of a start-up control device for an internal combustion engine according to this invention.

Referring to FIG. 1 of the drawings, a spark ignition multi-cylinder internal combustion engine 1 for a vehicle comprises an intake port 4 and an exhaust port 5 facing a combustion chamber 24 of each cylinder 23. The intake ports 4 are connected to an intake passage 2 via an intake collector 6. The exhaust ports 5 are connected to an exhaust passage 3 via a merge collector.

An electronic throttle 7 which regulates an intake air amount of the engine 1 in response mainly to a depression amount of an accelerator pedal with which the vehicle is provided is disposed in the intake passage 2. The intake air regulated by the electronic throttle 7 is temporarily stored in the collector 6 and then supplied to the intake port 4 of each cylinder 23. A fuel injector 25 is installed in the intake port 4.

The engine 1 further comprises a spark plug 21 facing the combustion chamber 24 and a piston 19 housed in the cylinder 23. The piston 19 is connected to a crank shaft via a connecting rod 20.

Figure 8:
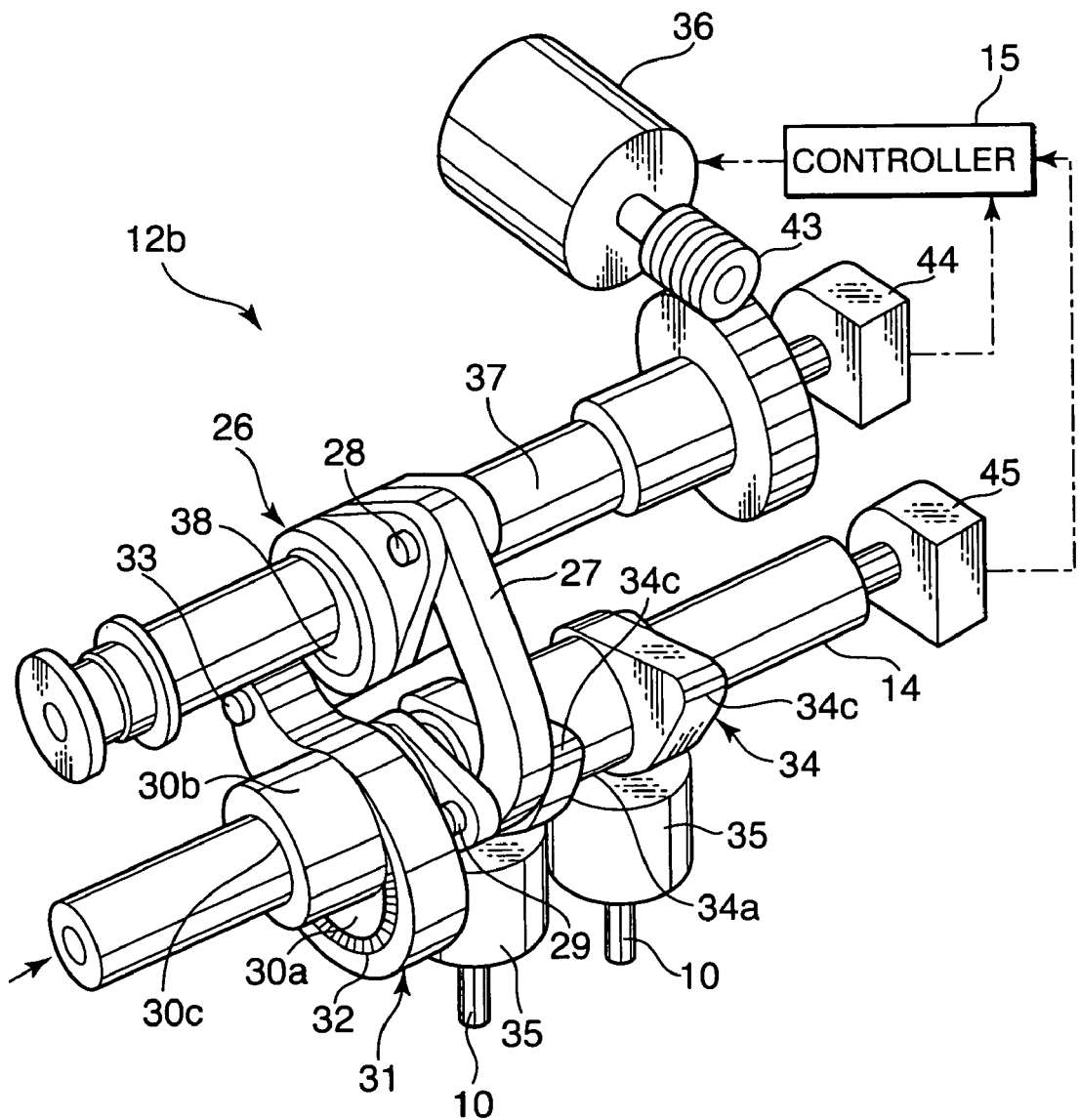
FIG. 8 is a perspective view of a Variable valve Event and Lift control (VEL) mechanism.

An intake valve 10 is provided at the intake port 4. An exhaust valve 11 is provided at the exhaust port 5. The intake valve 10 opens and closes according to the rotation of an intake cam shaft 14 which is shown in FIG. 8. The intake cam shaft 14 is driven by the crank shaft. The exhaust valve 11 opens and closes according to the rotation of an exhaust cam shaft 13 which is also driven by the crank shaft. Both the intake cam shaft 14 and the exhaust cam shaft 13 perform one rotation for every two rotations of the crank shaft.

The intake valve 10 and the exhaust valve 11 respectively open and close at predefined timings as the piston 19 reciprocates in the cylinder 23.

As the piston 19 reciprocates twice in the cylinder 23, the engine 1 performs a four-stroke cycle constituted by intake, compression, expansion and exhaust strokes.

In the intake stroke, as the piston 19 moves downward, the intake valve 10 opens and an air-fuel mixture, which is a mixture of the air supplied from the intake passage 3 and the fuel injected by the fuel injector 25, is aspirated into the combustion chamber through the intake port 4. In the compression stroke, the piston 19 compresses the mixture in the combustion chamber 24 while moving upward, and the spark plug 21 sparks to ignite the mixture in the vicinity of a top dead center position of the piston 19.

In the expansion stroke, the mixture, which is burning due to ignition by the spark plug 21, expands and pushes the piston 19 downward, causing the crank shaft to rotate. Having been pushed downward, the piston 19 moves upward again in the exhaust stroke due to an inertial rotational moment of the crank shaft, thereby expelling the combustion gas from the combustion chamber 24 to the exhaust passage 3.

The internal combustion engine 1 repeats the above four-stroke cycle in each cylinder 23. The positions of the pistons 19 differ from one another with a regular phase difference which is defined depending on the number of the cylinders 23.

The combustion gas expelled to the exhaust passage 3 is purified in a catalytic converter 22 and then emitted into the atmosphere.

The intake valve 10 and the exhaust valve 11 open and close at timings related to the above described four-stroke cycle action of the engine 1. With respect to the intake valve 10, however, a variable valve event and lift control (VEL) mechanism 12a and a variable valve timing control (VTC) mechanism 12b are provided for varying the operation characteristics, i.e., the lift amount and the opening/closing timing. The exhaust valve 11 is driven by a cam fixed to the exhaust cam shaft 23, and opens and closes always at constant timings defined by the profile of the cam.

Figure 9:
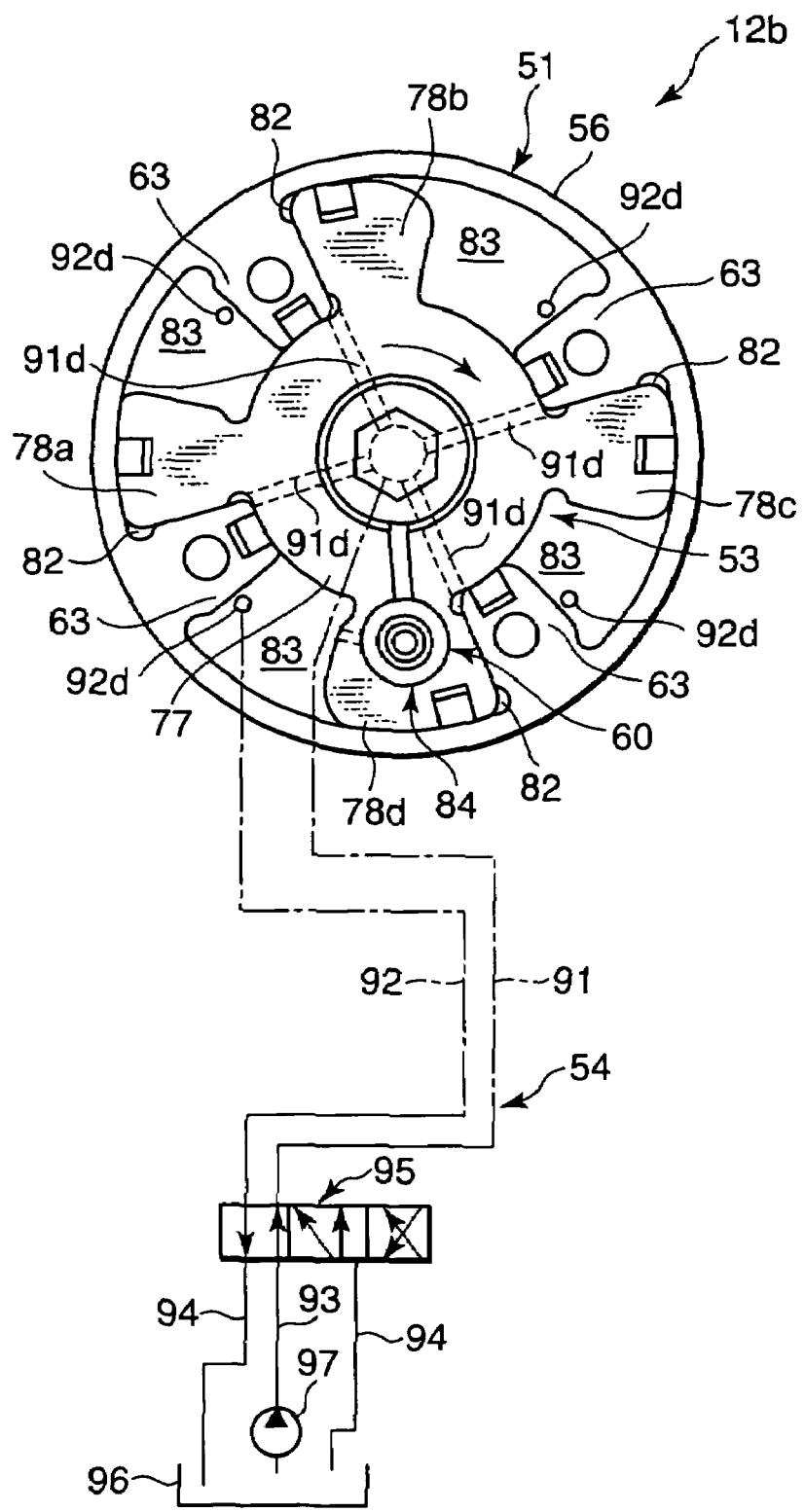
FIG. 9 is a front view of a Variable valve Timing Control (VTC) mechanism.

Referring now to FIGS. 8 and 9, the VEL mechanism 12a and the VTC mechanism 12b will be explained. The VEL mechanism 12a and the VTC mechanism 12b are known mechanisms disclosed in the aforesaid prior art JP2003-003872A.

The VEL mechanism 12a is a mechanism for arbitrarily varying the lift amount of the intake valve 10. The VTC mechanism 12b is a mechanism for arbitrarily varying a rotational phase difference between the crank shaft and the intake cam shaft 14.

Referring to FIG. 8, the VEL mechanism 12a comprises a control shaft 37 supported by a bearing fixed to a cylinder block of the engine 1 in parallel with the intake cam shaft 14. A circular control cam 38 is fixed onto the control shaft 37 such that the center axis thereof is eccentric with that of the control shaft 37. On the outer circumference of the control cam 38, a rocker arm 26 is fitted. The rocker arm 26 has a fitting hole enabling fitting onto the outer circumference of the control cam 38. The rocker arm 26 is formed in a diamond shape and the fitting hole is formed in its center portion.

An upper end of a link rod 27 which is formed in a crescent shape is connected to an end of the rocker arm 26 via a pin 28. A lower end of the link rod 27 is connected to an intake cam 34 via a pin 20. The intake cam 34 is formed in the shape of a rain drop and fitted onto the outer circumference of the intake cam shaft 14.

A drive cam 30 is fixed to the intake cam shaft 14. The drive cam 30 comprises a circular main body 30a and a cylindrical part 30b fixed to the main body 30a. Both the main body 30a and the cylindrical part 30b are fixed on the outer circumference of the intake cam shaft 14 and rotate together with the intake cam shaft 14. The cylindrical part 30b is concentric with the intake cam shaft 14, while the main body 30a having a larger diameter than the cylindrical part 30a is eccentric with the intake cam shaft 14.

A rink arm 31 is fitted onto the outer circumference of the main body 30a via a bearing 32. The rink arm 31 has a radial projection which is connected to the other end of the rocker arm 26, i.e. on the opposite side of the pin 28, via a pin 33.

As described hereintofore, the intake cam shaft 14 performs one rotation for every two rotations of the crank shaft. Accordingly, the drive cam 30 performs one rotation and oscillates the rocker arm 26 about the control shaft 37 via the pin 33. The link rod 27 which is connected to the other end of the rocker arm 26 then swings in an up/down direction and causes the intake cam 34 which is connected to the lower end of the rink rod 27 to swing in the same direction.

A valve lifter 35 having an operculated cylindrical shape is in contact with the intake cam 34 from beneath. The intake valve 7 is fixed to a lower end of the valve lifter 35. When the rain drop-shaped intake cam 34 swings down, the valve lifter 35 is pushed downward by the intake cam 34 and the intake valve 10 opens.

In the figure, two pairs of the intake cam 34 and the valve lifter 35 are shown. The internal combustion engine 1 is provided with two intake valves 10 in each cylinder 23, and the two intake cams 34 shown in the figure are constructed in one piece via a sleeve 34a which is fitted onto the outer circumference of the intake cam shaft 14. According to this construction, when one of the intake cams 34 is driven by the rink rod 27 to swing up and down, the other intake cam 34 also swings up and down in a similar manner, and as a result, the two intake valves 10 opens and closes synchronously.

When the rotation position of the control shaft 37 changes, the center of the control cam 38, i.e. a center of the oscillation of the rocker arm 26, becomes displaced. Accordingly, the distance between the center of the control cam 38 and the intake cam shaft 14 varies. The link rod 27 connected to the rocker arm 26 strokes further downward, as the distance between the center of the control cam 38 and the intake cam shaft 14 becomes shorter. As a result, the intake cam 34 is pushed further downward which brings about an increase in the valve lift amount of the intake valve 10.

In order to vary the rotation position of the control shaft 37, a gear 42 is fixed to an end of the control shaft 37, and a worm 43 meshing with the gear 42 and an electric actuator 44 which rotates the worm 43 are provided.

As described above, the VEL mechanism 12a varies the lift amount of the intake vale 10 in response to the rotation position of the control shaft 37. By detecting the rotation position of the control shaft 27, therefore, the valve lift amount of the intake valve 10 can be known. In the following description, the rotation position of the control shaft 37 is referred to as an operation angle of the VEL mechanism 12a.

The VEL mechanism 12a further comprises a VEL operation angle sensor 44 which detects the operation angle of the VEL mechanism 12a from the rotation position of the control shaft 37, or in other words a valve lift amount of the intake valve 10, and an intake cam shaft sensor 45 which detects the rotation position of the intake cam shaft 14.

Next, referring to FIG. 9, the VTC mechanism 12b is a so-called vane type VTC mechanism and is provided with a cam sprocket connected to the crank shaft of the engine 1 via a timing chain. The cam sprocket is also known as a timing sprocket. The cam sprocket is formed in a one piece construction with a cylindrical housing 56.

Inside the housing 56, a rotating member 53 which rotates together with the intake cam shaft 14 is disposed. The housing 56 comprises four partitions 63 projecting toward the center at intervals of 90 degrees. The rotating member 53 comprises a circular base portion 77 and four vanes 78a–78d projecting radially from the base portion 77 at intervals of 90 degrees. Each of the vanes 78a–78d is formed in the shape of an inverted trapezoid, projects in a space formed between the partitions 63, and separates the space into an advancing chamber 82 and a retarding chamber 83.

The housing 56 is tightly closed by a cover, and when the VTC mechanism 12b operates, the chambers 82 and 83 are respectively maintained in an oil-tight state. According to the above construction, the intake cam shaft 14 is connected to the crank shaft via the rotating member 53 and the housing 56. According to the rotation position of the vanes 78a–78d in the space between the partitions 63 with respect to the housing 56, the phase difference between the rotation of the intake cam shaft 14 and that of the crank shaft varies, and as a result, the opening/closing timing of the intake valve 10 varies.

In the figure, when the pressure in the advancing chamber 82 becomes higher than the pressure in the retarding chamber 83, the rotating member 53 rotates clockwise with respect to the housing 56. This relative rotation advances the opening/closing timing of the intake valve 10. In contrast, when the pressure in the retarding chamber 83 becomes higher than the pressure in the advancing chamber 82, the rotating member 53 rotates anti-clockwise with respect to the housing 56. This relative rotation retards the opening/closing timing of the intake valve 10.

As described above, by controlling the pressures in the advancing chambers 82 and retarding chambers 83, the opening/closing timing of the intake valve 10 can be controlled. The VTC mechanism 12b comprises an oil pressure circuit 54 to control these pressures.

The oil pressure circuit 54 comprises a first passage 91 for supplying high pressure work oil to the advancing chamber 82 and a second passage 92 for supplying high pressure work oil to the retarding chamber 83. The first passage 92 and the second passage 92 are connected to a high pressure passage 93 leading from the oil pump 97 and a drain passage 94 leading to an oil pan 96 via an electromagnetic change-over valve 95.

In the VTC 12b, four branch passages 91d spreading in radial directions from the first passage 91 and respectively leading to the advancing chambers 92 are formed in the base portion 77 of the rotating member 53. In the housing 56, four oil ports 92d are formed, each of which is connected to the second passage 92 and opens into the retarding chamber 83.

The electromagnetic change-over valve 95 comprises three sections, an advancing section that connects the first passage 91 with the high pressure passage 93 and connects the second passage 92 with the drain passage 94, a retarding section that connects the first passage 91 with the drain passage 94 and connects the second passage 92 with the high pressure passage 93, and a holding section that connects both the first and second passages 91, 92 to the high pressure passage 93. The electromagnetic change-over valve 95 switches these three sections in response to input signals.

The electromagnetic change-over valve 95 is duty controlled. That is to say, the electromagnetic change-over valve 95 applies the retarding section when the duty ratio is 0% so as to change the relative rotation position of the housing 56 and the rotating member 53 to a maximum retarded position. The electromagnetic change-over valve 95 applies the advancing section when the duty ratio is 100% so as to change the relative rotation positions of the housing 56 and the rotating member 53 to a maximum advanced position. When the duty ratio is a value between 0% and 100%, the electromagnetic change-over valve 95 applies the retarding section and the advancing position at a time ratio corresponding to the duty ratio so as to change the relative rotation position of the housing 56 and the rotating member 53 to a position which corresponds to the designated duty ratio. Once the relative rotation position of the housing 56 and the rotating member 53 specified by the duty ratio is realized, the electromagnetic change-over valve 95 applies the holding section to maintain the relative rotation position of the housing 56 and the rotating member 53 until another duty ratio is input into the electromagnetic change-over valve 95.

The VTC mechanism 12b further comprises a lock device 60 which fixes the relative rotation position of the housing 56 and the rotating member 53 at the maximum retarded position. In the figure, the maximum retarded position corresponds to the relative rotation position of the housing 56 and the rotating member 53 at which the retarding chambers 83 are expanded to a maximum extent and the advancing chambers 82 are contracted to a maximum extent. The lock device 60 comprises a pin hole formed in the housing 56 and an engaging hole formed in the vane 78d so as to overlap with the pin hole when the housing 56 and the rotating member 53 are at the maximum retarded position, and a lock pin 84 which penetrates the pin hole and the engaging hole.

It should be noted that the VTC mechanism 12b varies the opening timing of the intake valve 10 and the closing timing of the same together and is not capable of varying only one of the opening and closing timings without affecting the other one due to structural limitations. In order to vary the opening timing of the intake valve 10 without varying the closing timing of the same, cooperative control of the VEL mechanism 12a and the VTC mechanism 12b is required.

The VEL mechanism 12a and the VTC mechanism 12b should not be limited to the above described mechanism. Any mechanism that can vary the lift amount of the intake valve 10 may be used as the VEL mechanism 12a. Any mechanism that can vary the opening/closing timing of the intake valve 10 may be used as the VTC mechanism 12b.

Referring again to FIG. 1, operation control of the internal combustion engine 1 is performed by a controller 15. Specifically, the controller 15 controls an opening of the electronic throttle 7, a fuel injection amount and an injection timing of the fuel injector 25, an ignition timing of the spark plug 21, the valve lift amount of the intake valve 10 via the VEL mechanism 12a and the opening/closing timing of the intake valve 10 via the VTC mechanism 12b.

The controller 15 is constituted by a microcomputer comprising a central processing unit (CPU), a read-only memory (ROM), a random access memory (RAM), and an input/output interface (I/O interface). The controller 15 may be constituted by a plurality of microcomputers.

In order to perform the above control, various detection signals are input into the controller 15, including a signal from the aforesaid VEL operation angle sensor 44 which detects the operation angle of the VEL mechanism 12a, a signal from the aforesaid intake cam shaft sensor 45 which detects the rotation position of the intake cam shaft 14, a signal from an air flow meter which detects an intake air flow rate of the intake passage 2, a signal from an air/fuel ratio sensor 9 which detects, from the exhaust gas composition, an air/fuel ratio of the air-fuel mixture supplied to the combustion chamber 24, a signal from an accelerator pedal depression sensor 16 which detects a depression amount of an accelerator pedal with which the vehicle is provided, a signal from a crank angle sensor 17 which detects a rotation position of the crank shaft, a signal from a water temperature sensor 18 which detects a cooling water temperature of the internal combustion engine 1 and a signal from a starter switch 46 which detects whether or not the internal combustion engine 1 is being cranked.

During a period from cranking until warm up is complete, in order to decrease the wall flow amount, two methods may be considered as described hereintofore. One is decreasing the valve lift amount and retarding the opening/closing timing of the intake valve 10, and the other is promoting valve overlap between the intake valve 10 and the exhaust valve 11.

The controller 15 according to this invention selectively applies these two methods in response to the temperature of the intake valve 10 and the walls of the intake port 4. Herein, the cooling water temperature at engine start and an elapsed time from engine start are used as parameters representing the temperature of the intake valve 10 and the walls of the intake port 4. Further, the controller 15 minimizes the emission of unburned HC during start-up of the internal combustion engine 1 by performing control of the ignition timing of the spark plug 21 and the opening of the electronic throttle 7 in combination with the control of the valve lift amount of the intake valve 10 and the valve over lap amount between the intake valve 10 and the exhaust valve 11.

Specifically, when the internal combustion engine 1 is being cranked and in a state immediately after cranking, the controller 15 sets the lift amount of the intake valve 10 to a minimum lift amount so as to increase the intake air velocity. When the intake air velocity is increased, mixing of air and fuel in the combustion chamber 24 is enhanced and stable combustion is ensured, and hence the controller 15 retards the ignition timing so as to increase the temperature of the exhaust gas in this state.

When the temperature of the intake valve 10 and the walls of the intake port 4 has come up to a certain level, the controller 15 increases the lift amount of the intake valve 10 and causes valve overlap between the intake valve 10 and the exhaust valve 11. When causing the valve overlap, the controller 15 sets the closing timing of the intake valve 10 in the vicinity of the bottom dead center (BDC) so as to obtain a high effective compression ratio, and retards the ignition timing of the spark plug 21, thereby ensuring stable combustion.

Figure 2:
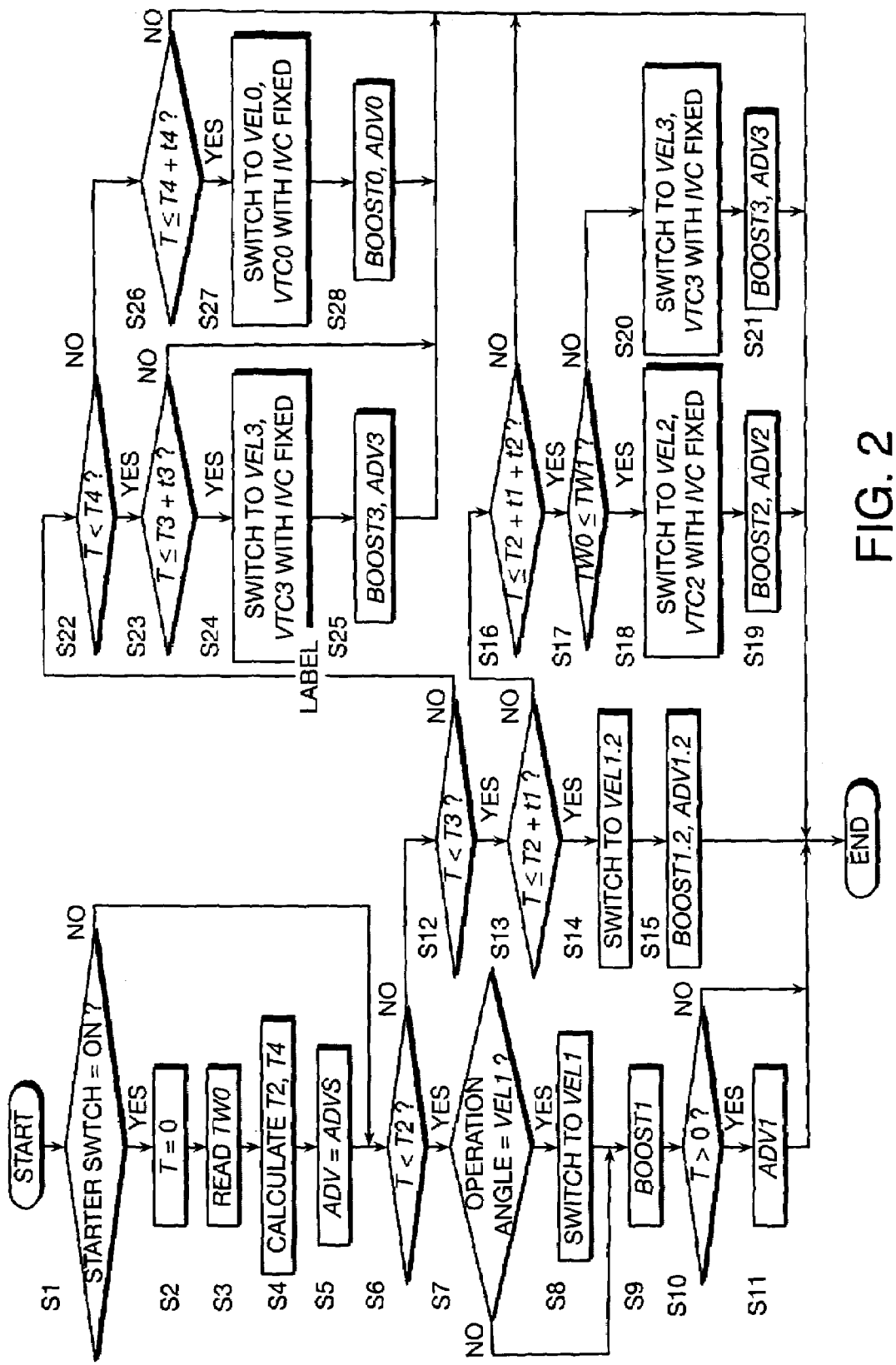
FIG. 2 is a flowchart describing an engine start-up control routine performed by a controller according to this invention.

Referring now to FIG. 2, an engine control routine performed by the controller 15 in order to realize the above engine control will be described.

The controller 15 performs this routine at intervals of ten milliseconds during a period from when the starter switch 46 is turned on until an ignition switch of the vehicle is turned off.

In a step S1, the controller 15 determines if the starter switch 46 is in a ON state. The ON state of the starter switch 46 denotes that the internal combustion engine 1 is being cranked. The OFF state of the starter switch 46 denotes that cranking of the engine 1 is complete and the engine 1 is rotating autonomously.

When the starter switch 46 is in the ON state, the controller 15, in a step S2, resets a counter value T, which represents an elapsed time from the engine start to zero. The controller 15 then performs the processing of a step S3. The elapsed time from the engine start means the elapsed time from when cranking of the engine 1 is completed. When the starter switch 46 is not in the ON state, i.e. when it is in the OFF state, the controller 15 skips the processing of steps S2–S4 and performs the processing of a step S5.

In the step S3, the controller 15 reads a cooling water temperature TW0. The cooling water temperature TW0 which is read in this step is a cooling water temperature during cranking of the engine 1, and hence TW0 is hereinafter referred to as the cooling water temperature at the engine start.

In the next step S4, the controller 15 determines predetermined times T2 and T4 from the cooling water temperature TW0 at the engine start. The predetermined times T2 and T4 are respectively expressed by a time elapsed from the time T1 at which counting of the counter value T actually starts.

The time period T0–T2 represents a time period during which an air/fuel ratio error due to a difference between fuel constituted by heavy components and fuel constituted by light components is large. A map of the predetermined time T2 is obtained through experiment according to the cooling water temperature TW0 at engine start, and stored in advance in the ROM of the controller 15.

Figure 10:
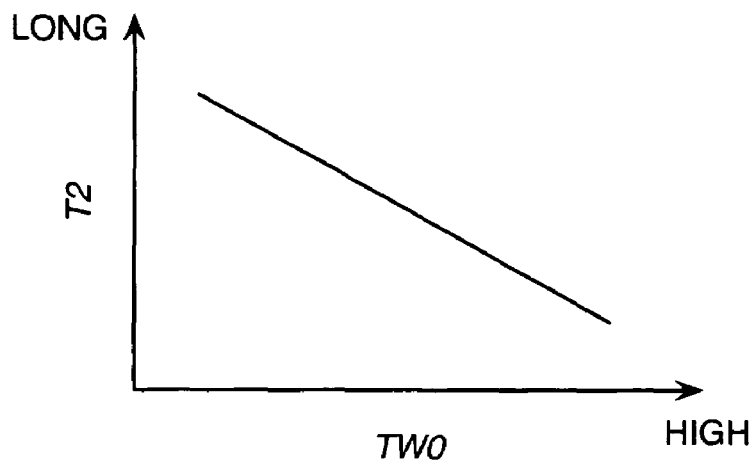
FIG. 10 is a diagram showing the characteristics of a map for determining a length of the first period, which is stored in the controller.

Referring to FIG. 10, according to this map, the predetermined time T2 is set to increase as the cooling water temperature TW0 at the engine start decreases. The controller 15, by referring to this map, determines the predetermined time T2 from the cooling water temperature TW0 at the engine start. It is also possible to set the predetermined time T2 at a fixed value to simplify the control algorithm. In the following description, the time period T0–T2 is referred to as a first period. The first period is set to a value within a range of 2–15 seconds, for example.

The predetermined time T4 denotes a time when the catalyst in the catalytic converter 22 is activated. The predetermined time T4 is also determined from a pre-stored map in the ROM depending on the cooling water temperature TW0 at the engine start. According to this map, the predetermined time T4 is set to increase as the cooling water temperature TW0 at engine start decreases. Instead of determining the predetermined time T4 in the step S4, it is possible to measure or estimate the catalyst temperature or an inlet temperature of the catalytic converter 22, determine if the catalyst is activated based on the measured or estimated temperature, and determine that the predetermined time T4 has been reached when the measured or estimated temperature has reached a predetermined activation temperature. It is possible to set the predetermined time T4 at a fixed value to simplify the control algorithm, but considering the processing of steps S20 and S21 which will be described later, the predetermined time T4 is preferably a variable depending on the cooling water temperature TW0 at the engine start.

In the step S5, the controller 15 sets the ignition timing of the spark plug 21 at an advanced timing ADVS for the engine start. The advanced timing ADVS is a fixed value.

In a next step S6, the controller 15 determines if the counter value T has reached the predetermined time T2, or in other words if the first period has ended. When the counter value T has reached the predetermined time T2, the controller 15 performs the processing of a step S7. When the counter value T has not reached the predetermined time T2, the controller 15 performs the processing of a step S12.

Figure 11:
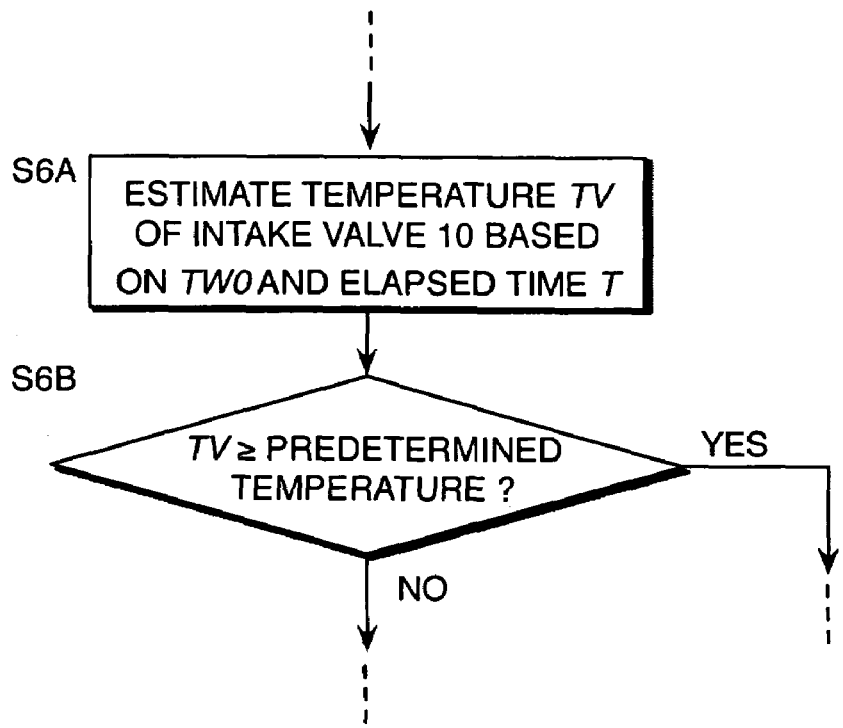
FIG. 11 is a flowchart describing a process for determining the termination of the first period according to another embodiment of this invention.

Herein, the elapsed time T is used as a parameter representing the temperature of the intake valve 10 and the walls of the intake port 4. The determination in the step S6 may be replaced by a determination as to whether or not the temperature of the intake valve 10 and the walls of the intake port 4 has reached a predetermined temperature. Specifically, this is realized by replacing the step S6 with steps 6A and 6B which are shown in FIG. 11. The controller 15 estimates the temperature TV of the intake valve 10 and the walls of the intake port 4 from the cooling water temperature TW0 at the engine start and the counter value T in the step S6A. The temperature TV of the intake valve 10 and the walls of the intake port 4 takes a higher value as the cooling water temperature TW0 at the engine start is higher and the counter value T increases. In the step S6A, the controller 15 determines if the first period has ended by determining if the temperature TV has reached the predetermined temperature.

Referring back to FIG. 2, in the next step S7, the controller 15 determines if the current operation angle of the VEL mechanism 12a is equal to an operation angle VEL1 for the minimum lift amount. When the determination in the step S7 is negative, the controller 15 shifts the operation angle of the VEL mechanism 12a to the operation angle VEL1 for the minimum lift amount in a step S8.

By shifting the operation angle of the VEL mechanism 12a to the operation angle VEL1 for the minimum lift amount, the opening timing IVO of the intake valve 10 is retarded and the closing timing IVC of the same is advanced. Herein, the retarded opening timing of the intake valve 10 corresponding to the operation angle VEL1 for the minimum lift amount is referred to as a first opening timing VTC1. More precisely, the first opening timing VTC1 corresponds to the opening timing of the intake valve 10 which is obtained when the operation angle of the VEL mechanism 12a is shifted to the operation angle VEL1 for the minimum lift amount from a state in which the opening/closing timing of the intake valve 10 is set for a normal idle running state of the internal combustion engine 1.

In the following description, the opening timing of the intake valve 10 is represented by a crank angle IVO, and the closing-timing of the same is represented by a crank angle IVC. Similarly, the closing timing of the exhaust valve 11 is represented by a crank angle EVO, and the closing timing of the same is represented by a crank angle ETC.

After the processing of the step S8 or when the determination in the step S7 is affirmative, the controller 15 performs the processing of a step S9. If the operation angle of the VEL mechanism 12a is set equal to the operation angle VEL1 for the minimum lift amount from the engine start, the processing of the step S7 and S8 may be omitted.

In the step S9, the controller 15, performs a boost correction in order to ensure stable combustion of the engine 1 and to prevent the engine rotation from fluctuating, or in other words to suppress fluctuation in an output power of the engine 1, in a state where the lift amount of the intake valve 10 is kept small and the opening timing IVO of the intake valve 10 is retarded. Specifically, the controller 15 controls an opening of the electronic throttle 7 (hereinafter referred to as a throttle opening) to a corrected opening BOOST1 which is predetermined for the minimum valve lift amount.

In a step S10, the controller determines if the counter value T is larger than zero. As can be understood from the control algorithm shown in FIG. 2, the counter value T is limited to a positive value or zero. As long as the starter switch 46 is in the ON state, the counter value T is reset to zero every time the routine is performed. Therefore, a counter value T larger than zero means that the starter switch 46 is in the OFF state. When the counter value T is larger than zero, the controller 15 sets the ignition timing of the spark plug 21 at a first retarded timing ADV1. The first retarded timing ADV1 is a timing value corresponding to a retarding limit for maintaining stable combustion of the engine 1 and preventing the engine rotation from fluctuating, in other words to suppress fluctuation in the output power of the engine 1, in a state where the opening timing IVO of the intake valve 10 is retarded.

After the processing of the step S11, the controller 15 terminates the routine. When the counter value T is zero in the step S10, the controller 15 immediately terminates the routine without performing the processing of the step S11.

Until the counter value T reaches the predetermined time T2 in the step S6, the controller 15 repeats the processing of the steps S7–S11. During this time period, the lift amount of the intake valve 10 is maintained at its minimum VEL1 and the intake velocity is increased so as to suppress the formation of a wall flow in the intake port 4 and on the intake valve 10.

When the counter value T reaches the predetermined time T2, the controller 15 performs the processing of the step S12.

In the step S12, the controller 15 determines if the counter value T has reached a predetermined time T3. The predetermined time T3 is a time when air/fuel ratio feedback control of the internal combustion engine 1 in response to a detection value of the air/fuel ration sensor 9 is started, or in other words a time when the air/fuel ratio sensor 9 is activated. The predetermined time T3 is preset according to the specifications of the air/fuel ratio sensor 9. Instead of performing the processing of the step S12, it is possible to estimate the temperature of the air/fuel ratio sensor 9 from the cooling water temperature TW0 at the engine start and the counter value T, and determine if the air/fuel ratio sensor 9 has been activated according to the estimated temperature. The predetermined time T3 is also expressed by a time elapsed from the time T1

When the counter value T has not reached the predetermined time T3 in the step S12, the controller 15 determines if the counter value T has reached a time T2+t1.

When the counter value T has not reached the time T2+t1, the controller 15, in a step S14, alters the operation angle of the VEL mechanism 12a to a provisional value VEL1.2 which makes the closing timing IVC of the intake valve 10 equal a timing IVC2. The timing IVC2 is a timing more retarded than the closing timing during the first period. The timing IVC2 may be a fixed value or a variable which is defined in a map according to an engine rotation speed or an engine load. The time period t1 represents a time period required for altering the operation angle of the VEL mechanism 12a from VEL1 to VEL1.2.

In a next step S15, the controller 15 respectively controls the throttle opening to a provisional boost correction value BOOST1.2 and the ignition timing of the spark plug 21 to a provisional timing ADV1.2, and terminates the routine. The provisional boost correction value BOOST1.2 specifies a smaller throttle opening than the throttle opening specified by the boost correction value BOOST1. The provisional timing ADV1.2 specifies an ignition timing that is less retarded than the first retarded timing ADV1.

It is also possible to maintain the first retarded timing ADV1 while shifting the throttle opening from BOOST1 to BOOST1.2 in the step S15.

When the counter value T has reached the time T2+t1 in the step S13, in a step S16, the controller 15 determines if the counter value T has reached a time T2+t1+t2. The time period from T2+t1+t2 to T3 is referred to as a second period in the following description. The second period is set to a value within a range of 5–13 seconds, for example.

When the determination in the step S16 is affirmative, in a step S17, the controller 15 determines if the cooling water temperature TW0 at the engine start is equal to or lower than a predetermined temperature TW1. The predetermined temperature TW1 is set to a value within 30–50 degrees Centigrade, for example. When the cooling water temperature TW0 at the engine start is equal to or lower than a predetermined temperature TW1, the controller 15 performs the processing of steps S18, S19, and when the cooling water temperature TW0 at the engine start is not equal to nor lower than a predetermined temperature TW1, the controller 15 performs the processing of steps S20, S21.

In the step S18, the controller 15 performs cooperative control of the VEL mechanism 12a and the VTC mechanism 12b in order to obtain valve overlap between the intake valve 10 and the exhaust valve 11 while maintaining the closing timing IVC of the intake valve 10 at the timing IVC2. Specifically, the controller 15 alters the operation angle of the VEL mechanism 12a to a value VEL2 which is larger than the provisional value VEL1.2, while shifting the opening timing of the intake valve 10 from the first opening timing VTC1 to a more advanced second opening timing VTC2. As a result of this processing, the closing timing IVC of the intake valve 10 is kept at the timing IVC2 and only the valve opening timing IVO is advanced to a timing which is more advanced than the closing timing EVC of the exhaust valve 11 such that a target valve overlap amount O/L2 is realized. The time period t2 represents a time period required for shifting the opening timing of the intake valve 10 from VTC1 to VTC2

The target value O/L2 of the valve overlap amount may be preset as a fixed value or may be determined by referring to a map that is defined according to the cooling water temperature TW0 at the engine start. In the latter case, the characteristic of the map is determined such that the target value O/L2 increases as the cooling water temperature TW0 at the engine start decreases.

In the next step S19, the controller 15 respectively controls the throttle opening to a boost correction value BOOST2 and the ignition timing of the spark plug 21 to a second retarded timing ADV2, and then terminates the routine. The boost correction value BOOST2 specifies a smaller throttle opening than the throttle opening specified by the provisional boost correction value BOOST1.2. The second retarded timing ADV2 specifies an ignition timing that is less retarded than the provisional retarded timing ADV1.2.

In the step S20, the controller 15 performs cooperative control of the VEL mechanism 12a and the VTC mechanism 12b in order to increase the valve lift amount of the intake valve 10, while maintaining the closing timing IVC of the intake valve 10 at the timing IVC2 as in the case of the step S18. Specifically, the controller 15 alters the operation angle of the VEL mechanism 12a to a value VEL3 which is smaller than the value VEL2, while shifting the opening timing of the intake valve 10 from the first opening timing VTC1 to a third opening timing VTC3. The third opening timing VTC3 is more advanced than the first opening timing VTC1 but less advanced than the second opening timing VTC2.

According to this processing, the valve overlap amount is controlled to a target value O/L3 almost equal to zero which is a value applied in the normal idle running state of the engine 1. It should be noted that the relations VEL2>VEL3>VEL1 and VTC2>VTC3>VTC1 hold in the above description.

The reason why the target overlap amount O/L3 which nearly equals zero is applied in the step S20 instead of the target overlap amount O/L2 is explained below.

When the cooling water temperature TW0 at the engine start is not lower than the predetermined temperature TW1, the temperature of the intake valve and the walls of the intake port 4 is also high and atomization of the injected fuel is promoted further in comparison with the case where the cooling water temperature TW0 at the engine start is lower than TW1. As a result, the favorable effect in atomization of the injected fuel brought about by the valve overlap is small. In this condition, therefore, the smaller target overlap amount O/L3 is applied.

In the next step S22, the controller 15 respectively controls the throttle opening to a boost correction value BOOST3 and the ignition timing of the spark plug 21 to a third retarded timing ADV3, and terminates the routine. The boost correction value BOOST3 specifies an even smaller throttle opening than the throttle opening specified by the correction value BOOST2. The third retarded timing ADV3 specifies an ignition timing that is equal to or more retarded than the first retarded timing ADV1. This is because, by suppressing the valve over lap amount to the small value O/L3, the stability of combustion increases and the ignition timing of the spark plug 21 can be retarded further. By thus retarding the ignition timing further, the catalyst in the catalytic converter 22 is activated earlier which reduces emission of unburned HC. After the processing of the step S21, the controller 15 terminates the routine.

According to the processing of the step S17–S21, when the cooling water temperature TW0 at the engine start is lower than the predetermined temperature TW1, the valve overlap amount is increased from a negative value at the engine start to the target value O/L2, and decreased to the target value O/L3 which is almost equivalent to the value applied in a normal idle running state. When the cooling water temperature TW0 at the engine start is not lower than the predetermined temperature TW1, the valve overlap amount is increased from the negative value at the engine start directly to the target value O/L3.

Instead of the processing of the steps S17–S21, other processing is possible such that the valve overlap amount is increased from the negative value at the engine start to the target value O/L2 irrespective of the cooling water temperature TW0 at the engine start. In this case, however, the target value O/L2 should be a variable depending on the cooling water temperature TW0 at the engine start. A map defining the target value O/L2 according to the cooling water temperature TW0 at the engine start is pre-stored in the ROM of the controller 15. If this map has a characteristic such that the target value O/L2 decreases as the cooling water temperature TW0 at the engine start increases and becomes equal to the target value O/L3 when the cooling water temperature TW0 at the engine start is higher than the predetermined temperature TW1, the same result as in the case of the processing of the steps S17–S21 will be obtained.

Now, referring back to the step S12, when the counter value T has reached the time T3, the controller 15 proceeds with feedback control of the air/fuel ratio, i.e. λ control, of the engine 1. In this routine, the controller 15 performs the processing of steps S22–S28.

First, in the step S22, the controller 15 determines if the counter value T has reached a predetermined time T4.

When the counter value T has not reached the predetermined time T4, the controller 15, in the step S23, determines if the counter value T has reached a time T3+t3. Herein, the time period t3 represents a time period required for varying the valve overlap amount to the target value O/L3 from O/L2. The time period from T3+t3 to T4 is referred to as a third period in the following description. The third period is set to about 10 seconds, for example.

When the counter value T has not reached the time T3+t3, the controller 15, in the step S24, performs cooperative control of the VEL mechanism 12a and the VTC mechanism 12b as in the case of the step S20 in order to alter the operation angle of the VEL mechanism 12a to the value VEL3, while shifting the opening timing of the intake valve 10 to the third opening timing VTC3, thereby decreasing the valve overlap amount to the target value O/L3 which is smaller than O/L2, while maintaining the closing timing IVC of the intake valve 10. By thus decreasing the valve overlap amount, the residual combustion gas in the combustion chamber 24 decreases, and the stability of combustion increases. Accordingly, the ignition timing of the spark plug 21 can be retarded to a great extent.

In the next step S25, the controller 15 respectively controls the throttle opening to the boost correction value BOOST3 and the ignition timing of the spark plug 21 to the third retarded timing ADV3 as in the case of the step S21. When the air/fuel ratio of the engine 1 is controlled to the stoichiometric air/fuel ratio by λ control, retarding the ignition timing causes a so-called after combustion, thereby further reducing the emission of unburned HC.

In the step S23, when the counter value T has reached the time T3+t3, the controller 15 skips the steps S24 and S25, and immediately terminates the routine.

In the step S22, when the counter value T has reached the predetermined time T4, the controller 15, in the step S26, determines if the counter value T has reached a time T4+t4.

When the counter value T has not reached a time T4+t4, the controller 15, in the step S27, performs cooperative control of the VEL mechanism 12a and the VTC mechanism 12b in order to realize an opening/closing timing of the intake valve 10 for the normal idle running state of the engine 1, while preventing the opening timing IVO of the same from changing. Specifically, the operation angle VEL of the VEL mechanism 12a and the opening timing IVO of the VTC mechanism 12b are respectively set to VEL0 and VTC0 which are the values applied for the normal idle running state of the engine 1. The time value t4 corresponds to a time period required for accomplishing this processing.

In the next step S28, the controller 15 cancels the boost correction and the collection of the ignition timing. Specifically, the controller 15 resets the boost correction value to BOOST0 and the ignition timing to ADV0, both of which are the values for the normal idle running state of the engine 1. After the processing of the step S28, the controller 15 terminates the routine.

Accordingly, this routine is substantially performed during a period from cranking of the engine 1 to the time T4+t4 only.

Next, referring to FIGS. 3A–3K and FIGS. 4–7, the actions and effects obtained by the execution of this control routine will be described.

Herein, the internal combustion engine 1 is designed to take a minimum valve lift amount when it starts to operate, and upward correction of fuel injection amount which is applied during the engine start-up has been set on the assumption that fuel constituted by heavy components is used. When the above control routine is performed to control this internal combustion engine 1, the following effects are obtained.

Figure 3:
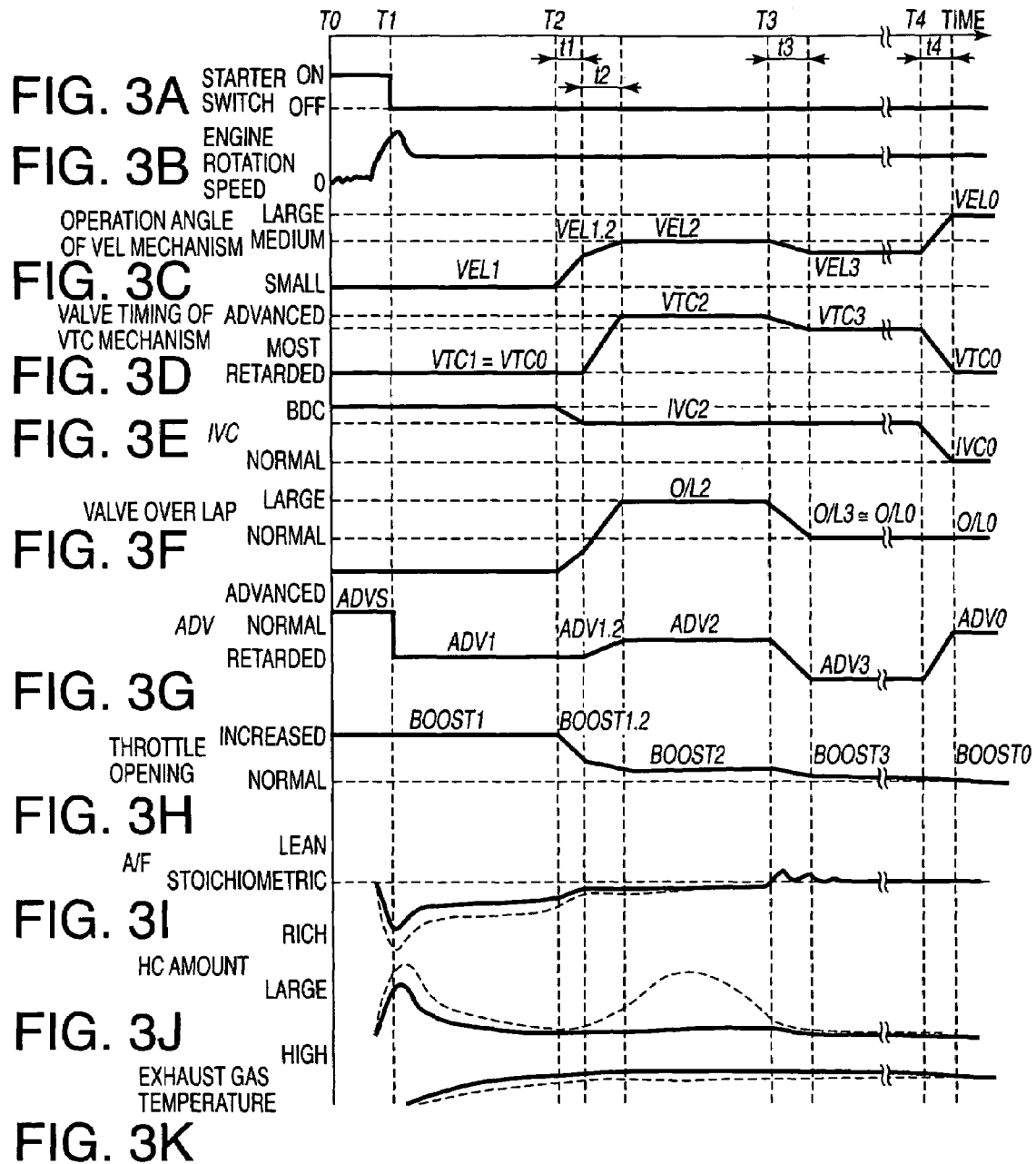
FIGS. 3A–3K are timing charts showing a result of the execution of the engine start-up control routine.

At the time T0, the starter switch 46 is turned on, and the engine 1 is cranked and starts to rotate. Due to the processing of the step S8, the operation angle of the VEL mechanism 12a is kept at VEL1 which realizes the minimum lift amount of the intake valve 10, and the opening timing of the intake valve 10 is kept at VTC1, as shown in FIGS. 3C, 3D. In this state, the closing timing IVC of the intake valve 10 is retarded from the bottom dead center (BDC) and the valve overlap amount between the intake valve 10 and the exhaust valve 11 takes a negative value.

In order to ensure a favorable starting performance in the engine 1, the ignition timing ADV of the spark plug 21 is set at the advanced timing ADVS, and the throttle opening is set at the corrected opening BOOST1 for the minimum valve lift amount, as shown in FIGS. 3G, 3H.

At the time T1 when the starter switch 46 is turned off, or the internal combustion engine 1 starts to autonomously rotate, in the step S11, the ignition timing ADV of the spark plug 21 is shifted from the advanced timing ADVS to the first retarded timing ADV1 which is more retarded than the ignition timing ADV0 for the normal idle running state of the engine 1 as shown in FIG. 3G. The first retarded timing ADV1 is maintained until the time T2 is reached. The time T2 represents the end of the period during which increase in the intake air velocity brings about a favorable effect in decreasing the emission of unburned HC.

Figure 4:
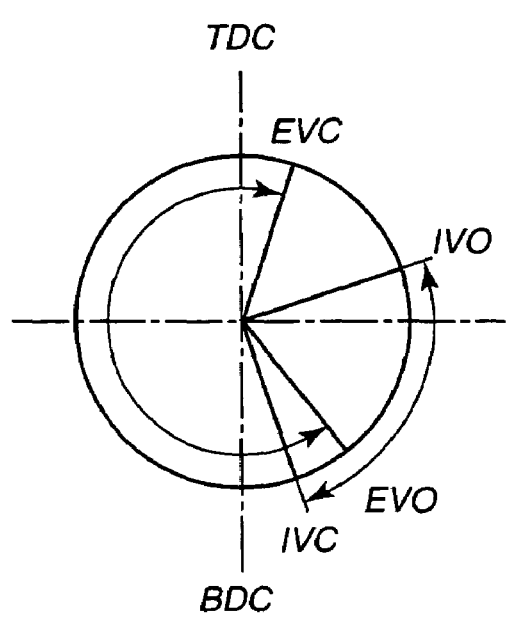
FIG. 4 is a diagram for describing an opening/closing timing of an intake valve and that of an exhaust valve during a first period as a result of the execution of the engine start-up control routine

FIG. 4 shows the opening/closing timings of the intake valve 10 and the exhaust valve 11 during the first period T0–T2. As shown in the figure, the exhaust valve 11 opens at the timing EVO before the bottom dead center (BDC), and closes at the timing EVC in the vicinity of the top dead center (TDC). The opening timing EVO and the closing timing EVC of the exhaust valve 11 are respectively fixed throughout the entire period of engine operation.

The intake valve 10 opens at the timing IVO which is located between the top dead center (TDC) and the bottom dead center (BDC) and closes at the timing IVC preceding the bottom dead center (BDC). As can be understood from the figure, the opening timing IVO of the intake valve 10 is distant from the closing timing EVC of the exhaust valve 11 and therefore no valve overlap exists between the intake valve 10 and the exhaust valve 11. The valve overlap amount, when expressed in terms of the crank angle, takes a negative value in this state.

During the first period T0–T2 which includes a cranking period of the engine 1, the intake air velocity is increased by setting the operation angle of the VEL mechanism 12a at VEL1 for the minimum valve lift amount and accordingly, adjusting the ignition timing and the throttle opening. Increase in the intake air velocity decreases wall flow, and hence the increase correction amount of fuel injection amount when the engine 1 is started can be small. As a result, irrespective of the differences between fuel constituted by heavy components and fuel constituted by light components, the emission of unburned HC is suppressed during the first period T0–T2, as in the case of the prior art device.

The solid lines in FIGS. 3J–3K respectively denote variations in the air/fuel ratio of the air/fuel mixture supplied to the combustion chamber 24, the amount of emitted unburned HC, and the temperature of the exhaust gas as a result of execution of the above control routine according to this invention. The dotted lines in the figures respectively denote the same in a case where the valve lift amount and valve timings of the intake valve 10 are fixed.

By increasing the intake air velocity during the first period T0–T2, the amount of emitted unburned HC is suppressed as shown in FIG. 3J due to the small increase correction amount of the fuel injection amount irrespective of the component characteristics of the fuel used. Since the increase correction amount of the fuel injection amount is suppressed to a small extent, the air/fuel ratio of the air/fuel mixture supplied to the combustion chamber 24 is less rich than in a case where the valve lift amount and valve timings of the intake valve 10 are fixed.

At the time T1, the ignition timing of the spark plug 21 is shifted to the first retarded timing ADV1 that accelerates increase in the exhaust gas temperature. The reason why the ignition timing can be retarded is that the mixing of air and fuel in the combustion chamber 24 is enhanced due to the increase in the intake air velocity, and thus stable combustion is ensured.

At the time T2, in order to make the closing timing IVC of the intake valve 10 equal the value IVC2, the operation angle of the VEL mechanism 12a is shifted to the transient value VEL1.2 in the step S14, and accordingly, the throttle opening is set equal to the boost correction value BOOST1.2 and the ignition timing is set equal to the provisional timing ADV1.2.

When the time T2 has been reached, the operation angle of the VEL mechanism 12a is shifted to the provisional value VEL1.2 in the step S14 such that the closing timing IVC of the intake valve 10 becomes equal to the value IVC2. Accordingly, in the step S15, the throttle opening is set equal to the provisional boost correction value BOOST1.2, and the ignition timing is set at the provisional timing ADV1.2.

When the time T2+t2 has been reached, the processing of the steps S18, S19 or the processing of the steps S20, S21 is performed, depending on the cooling water temperature TW0 at the engine start.

When the cooling water temperature TW0 at the engine start is equal to or lower than the predetermined temperature TW1, in the step S18, the operation angle of the VEL mechanism 12a is shifted to the value VEL2 which is greater than the provisional value VEL1.2, and the VTC mechanism 12b is controlled to shift the opening timing IVO of the intake valve 10 from the first opening timing VTC1 to the more advanced second opening timing VTC2 so as to realize the target valve overlap amount O/L2. Accordingly, in the step S19, the throttle opening is set equal to the boost correction value BOOST2 and the ignition timing ADV is set equal to the second retarded timing ADV2.

When the cooling water temperature TW0 at the engine start is higher than the predetermined temperature TW1, in the step S20, the operation angle of the VEL mechanism 12a is shifted to the value VEL3 which is greater than the value VEL2 and the VTC mechanism 12b is controlled to shift the opening timing IVO of the intake valve 10 from the first opening timing VTC1 to the third opening timing VTC3 which is less advanced than the second opening timing VTC2, so as to realize the target valve overlap amount O/L3. Accordingly, in the step S21, the throttle opening is set equal to the boost correction value BOOST3 and the ignition timing ADV is set equal to the third retarded timing ADV3.

FIGS. 3A–3K represent a case where the cooling water temperature TW0 at the engine start is lower than the predetermined temperature TW1. Herein, according to the execution of the processing of the steps S18, S19, the valve overlap amount reaches the target valve overlap amount O/L2 at the time T2+t1+t2, while the closing timing IVC2 of the intake valve 10 is maintained. Thereafter, the controller 15 maintains this state until the time T3 is reached.

Figure 5:
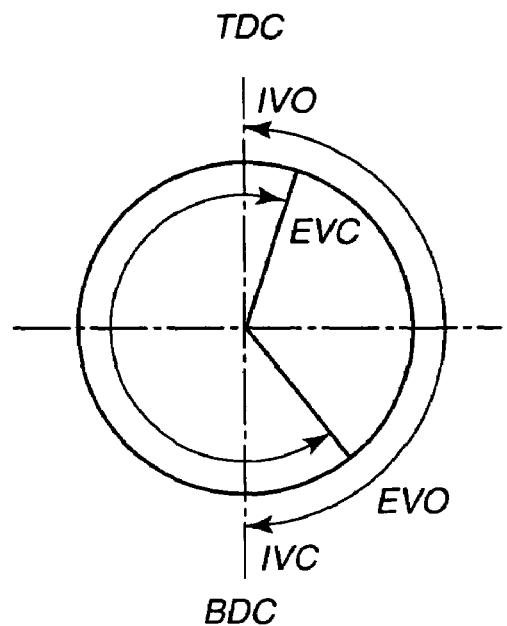
FIG. 5 is a diagram for describing an opening/closing timing of the intake valve and that of the exhaust valve during a second period as a result of the execution of the engine start-up control routine

FIG. 5 shows the opening/closing timings of the intake valve 10 and the exhaust valve 11 during the second period from the time T2+t1+t2 until the time T3. Herein, the intake valve 10 opens in the vicinity of the (TDC) and closes in the vicinity of the bottom dead center (BDC). According to this opening/closing timing, a large valve overlap amount O/L2 is obtained. The section between IVO and EVC in the figure corresponds to the valve overlap amount O/L2. By thus retarding the closing timing IVC of the intake valve 10 to the vicinity of the bottom dead center (BDC), the effective compression ratio of the internal combustion engine 1 can be set to a large value. As a result, the ignition timing ADV can be retarded to the third retarded timing ADV3 which is close to the first retarded timing ADV1 for the minimum valve lift amount.

As described above, by promoting a valve overlap after the time T2 when the wall flow decreasing effect due to increase in the intake air velocity diminishes, blow back of the combustion gas is promoted and the atomization of the injected fuel into the intake air is enhanced using the heat of the combustion gas. As a result, a favorable effect in terms of suppressing the emission of unburned HC is obtained.

In contrast, when the valve overlap does not exist in the second period, atomization of the injected fuel by the blow back of the combustion gas is not promoted. As a result, as shown by a dotted line in FIG. 3J, the emission of unburned HC is increased. This phenomenon appears not only in an engine with a fixed valve lift amount and timing, but also in an engine in which the valve lift amount is decreased and the valve opening timing is retarded throughout the engine start-up period. This invention reduces the emission of unburned HC as shown in the solid line in the figure by promoting the valve overlap in the second period.

When the time T3 has been reached, feedback control of the air/fuel ratio, or λ control, of the engine 1 starts and thereafter the air/fuel ratio is maintained at the stoichiometric air/fuel ratio as shown in FIG. 3I.

During the period from the time T3 until the time T3+t3, the controller 15 controls the VEL mechanism 12a and the VTC mechanism 12b in the step S24 so as to realize the target valve overlap amount O/L3 which nearly equals zero, while maintaining the closing timing IVC of the intake valve 10 at the timing IVC2. Once the target overlap amount O/L3 is attained at the time T3+t3, it is maintained until the time T4 is reached.

Figure 6:
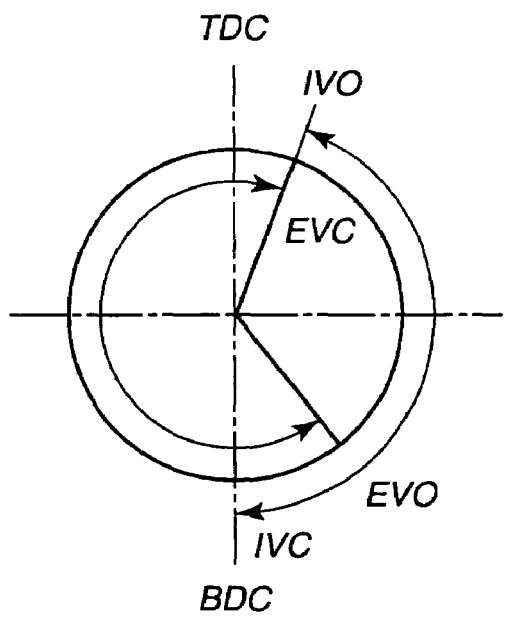
FIG. 6 is a diagram for describing an opening/closing timing of the intake valve and that of the exhaust valve during a third period as a result of the execution of the engine start-up control routine

FIG. 6 shows the opening/closing timings of the intake valve 10 and the exhaust valve 11 during the third period from the time T3+t3 until the time T4. Herein, the intake valve 10 opens after the top dead center (TDC) and closes in the vicinity of the bottom dead center (BDC). In this figure, the closing timing EVC of the exhaust valve 11 and the opening timing IVO of the intake valve 10 are identical, and hence, the valve overlap amount is zero.

According to this setting, an after-burn effect caused by the retarded ignition timing raises the temperature of the exhaust gas, which accelerates activation of the catalyst in the catalytic converter 23. Early activation of the catalyst also has the effect of suppressing the emission of unburned HC.

After the time T4, the controller 15 shifts the operation angle of the VEL mechanism 12a to the value VEL0 for the normal idle running state of the engine 1 and, in order to keep the opening timing IVO of the intake valve 10 unchanged, shifts the opening timing of the intake valve 12b to the value VTC0 for the normal idle running state of the engine 1. After the time T4+t4, the internal combustion engine 1 is operated normally under this setting.

Figure 7:
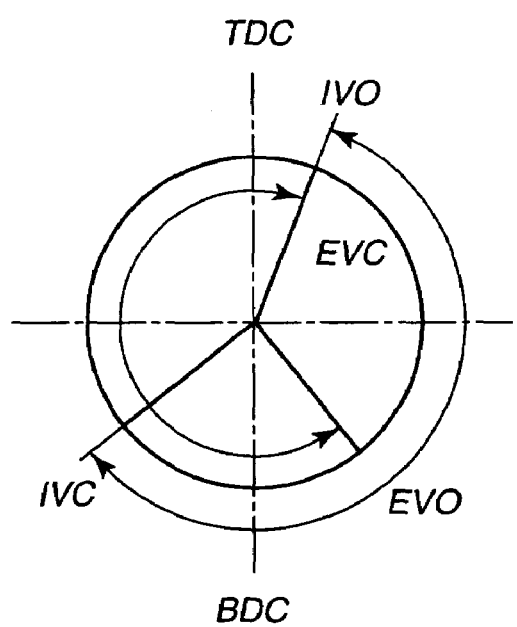
FIG. 7 is a diagram for describing an opening/closing timing of the intake valve and that of the exhaust valve in a normal idle running state of the engine.

FIG. 7 shows the opening/closing timings of the intake valve 10 and the exhaust valve 11 in the normal idle running state of the engine 1. Herein, the opening timing IVO of the intake valve 10 is identical to that of the third period and the valve overlap amount is zero. On the other hand, the closing timing IVC of the intake valve 10 is shifted to a timing more retarded than the bottom dead center (BDC) and the intake valve 10 operates with the maximum lift amount.

As described hereintofore, during the first period which starts with the engine start, the temperature of the intake valve 10 and walls of the intake port 4 is low. In this state, the controller 15 suppresses the valve lift amount of the intake valve 4 to the minimum amount in order to increase the intake air velocity, thereby suppressing the formation of a wall flow irrespective of the differences between fuel constituted by heavy components and fuel constituted by light components. The controller 15 also retards the ignition timing of the spark plug 21 to raise the temperature of the exhaust gas so as to promote early activation of the catalyst in the catalytic converter 22.

In contrast, during the second period in which the temperature of the intake valve 10 and walls of the intake port 4 has been raised to a certain level, the controller 15 promotes a valve overlap between the intake valve 10 and the exhaust valve 11 by setting the closing timing IVC of the intake valve 10 in the vicinity of the bottom dead center (BDC). As a result, blow back of the combustion gas is promoted and atomization of the injected fuel is enhanced using the heat of the combustion gas blown back to the intake port 4. According to this processing, the emission of unburned HC is further suppressed. During the second period, the controller 15 sets the ignition timing of the spark plug 21 at the second retarded timing ADV2 which is more retarded than the ignition timing ADV0 for the normal idle running state of the engine 1. A favorable effect of raising the temperature of the exhaust gas therefore still continues to exist such that early activation of the catalyst in the catalytic converter 22 is ensured.

During the third period, the controller 15 shifts the opening timing IVO of the intake valve 10 to a more retarded timing, and hence, activation of the catalyst is accelerated due to further increase in the exhaust gas temperature. It should be noted that even during the second period this control is applied when the cooling water temperature TW0 at the engine start is higher than the predetermined temperature TW1, thereby decreasing fuel consumption during start-up of the engine 1.

The controller 15 controls the electronic throttle 7 such that the output power of the engine 1 does not vary during the transition from the first period to the second period and the transition from the second period to the third period, and hence no deterioration in the output performance of the internal combustion engine 1 is brought about by the execution of this control routine. Since the controller 15 determines the length of the first period according to the cooling water temperature TW0 at the engine start, the first period can be determined appropriately by inspecting in advance the relationship between the cooling water temperature TW0 at the engine start and the time point at which the air/fuel ratio error due to differences between fuel constituted by heavy components and fuel constituted by light components starts to increase.

The contents of Tokugan 2005-187822, with a filing date of Jun. 28, 2005 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

What is claimed is:

1. A start control device for an internal combustion engine, the engine comprising an intake valve and an exhaust valve, comprising:
    means for varying a lift amount of the intake valve and a valve overlap amount between the intake valve and the exhaust valve;
    means for controlling the varying means to maintain a predetermined lift amount and a predetermined valve overlap amount during a normal idle running state of the engine;
    means for controlling the varying means during a first period, which starts from a start of the engine, to apply a smaller lift amount than the predetermined lift amount; and
    means for controlling the varying means during a second period, which starts after the first period ends, to apply a greater valve overlap amount than the predetermined valve overlap amount.

2. A start control device for an internal combustion engine, the engine comprising an intake valve and an exhaust valve, comprising:
    a mechanism which varies a lift amount of the intake valve and a valve overlap amount between the intake valve and the exhaust valve; and
    a programmable controller programmed to:
        control the mechanism to maintain a predetermined lift amount and a predetermined valve overlap amount during a normal idle running state of the engine;
        control the mechanism during a first period, which starts from a start of the engine, to apply a smaller lift amount than the predetermined lift amount; and
        control the mechanism during a second period, which starts after the first period ends, to apply a greater valve overlap amount than the predetermined valve overlap amount.

3. The start control device as defined in claim 2, wherein the mechanism functions to shift an opening timing of the intake valve, and the controller is further programmed to control the mechanism during the first period to set the opening timing of the intake valve at a timing which is more retarded than the opening timing of the intake valve in the normal idle running state, and control the mechanism during the second period to set the opening timing of the intake valve at a timing which is more advanced than the opening timing of the intake valve in the normal idle running state.

4. The start control device as defined in claim 3, wherein the engine further comprise a spark plug, the first period includes a period after complete combustion during which the engine rotates autonomously, and the controller is further programmed to set an ignition timing of the spark plug in the period after complete combustion to a timing which is more retarded than an ignition timing of the spark plug in the normal idle running state.

5. The start control device as defined in claim 3, wherein the mechanism functions to vary a closing timing of the intake valve, and the controller is further programmed to control the mechanism during the second period to set the opening timing of the intake valve at a timing which is more advanced than a closing timing of the exhaust valve and more advanced than the opening timing of the intake valve in the normal idle running state, while setting the closing timing of the intake valve at a timing in the vicinity of a bottom dead center.

6. The start control device as defined in claim 5, wherein the engine further comprises a spark plug, and the controller is further programmed to set an ignition timing of the spark plug at a timing which is more retarded than an ignition timing of the spark plug in the normal idle running state.

7. The start control device as defined in claim 2, wherein the first period is set to increase as an engine cooling water temperature at the start of the engine decreases.

8. The start control device as defined in claim 7, wherein the device further comprises a cooling water temperature sensor which detects an engine cooling water temperature of the engine, and the controller is further programmed to estimate a temperature of the intake valve based on the engine cooling water temperature at a start of the engine and an elapsed time from the start of the engine, and determine that the first period has ended when the temperature of the intake valve reaches a predetermined temperature.

9. The start control device as defined in claim 2, wherein the controller is further programmed to control the mechanism during the second period to set a closing timing of the intake valve at a timing which is more retarded than a closing timing of the intake valve in the first period and set an opening timing of the intake valve at a timing which is more advanced than an opening timing of the intake valve in the first period, by increasing the lift amount of the intake valve.

10. The start control device as defined in claim 2, wherein the engine further comprises an exhaust passage and an air/fuel ratio sensor which detects an air/fuel ratio of an air-fuel mixture from an exhaust gas composition in the exhaust passage, and a time length of the second period is determined in advance such that the second period ends when the air/fuel ratio sensor has been activated.

11. The start control device as defined in claim 10, wherein the controller is further programmed to control the mechanism during a third period, which starts after the second period ends to set an opening timing of the intake valve at a timing which is more retarded than an opening timing of the intake valve in the second period, while setting a closing timing of the intake valve in the vicinity of a bottom dead center of the engine.

12. The start control device as defined in claim 11, wherein the engine further comprises a spark plug, and the controller is further programmed to retard an ignition timing of the spark plug in the third period to a timing which is more retarded than an ignition timing of the spark plug in the first period and the second period.

13. The start control device as defined in claim 11, wherein the engine further comprises a spark plug, and the controller is further programmed to control the mechanism during the second period to set the opening timing of the intake valve at a timing equal to the opening timing of the intake valve during the third period, and set an ignition timing of the spark plug at a timing equal to an ignition timing of the spark plug during the third period, when an engine cooling water temperature at the start of the engine is higher than a predetermined temperature.

14. The start control device as defined in claim 11, wherein the engine further comprises an exhaust gas purification catalyst which is provided in the exhaust passage, and a time length of the third period is determined in advance such that the third period ends when the exhaust gas purification catalyst has been activated.

15. The start control device as defined in claim 11, wherein the engine further comprises a throttle which regulates an intake air amount of the engine, and the controller is further programmed to control an opening of the throttle so as to compensate for an output force variation of the engine when controlling the mechanism.

16. A start control method for an internal combustion engine, the engine comprising an intake valve, an exhaust valve, and a mechanism which varies a lift amount of the intake valve and a valve overlap amount while both the intake valve and the exhaust valve are open, the method comprising:

controlling the mechanism to maintain a predetermined lift amount and a predetermined valve overlap amount during a normal idle running state of the engine;

controlling the mechanism to apply a smaller lift amount than the predetermined lift amount during a first period which starts from a start of the engine; and controlling the mechanism to apply a greater valve overlap amount than the predetermined valve overlap amount during a second period which starts after the first period ends.

* * * * *